United States Patent

Chen et al.

[11] Patent Number: 6,120,890
[45] Date of Patent: Sep. 19, 2000

[54] MAGNETIC THIN FILM MEDIUM COMPRISING AMORPHOUS SEALING LAYER FOR REDUCED LITHIUM MIGRATION

[75] Inventors: Qixu Chen, Milpitas; Xing Song, Mountain View; Liji Huang, San Jose; Charles Leu, Fremont; Rajiv Ranjan, San Jose, all of Calif.

[73] Assignee: Seagate Technology, Inc., Scotts Valley, Calif.

[21] Appl. No.: 09/186,074

[22] Filed: Nov. 5, 1998

Related U.S. Application Data

[60] Provisional application No. 60/069,539, Dec. 12, 1997.

[51] Int. Cl.$^7$ ......................................................... G11B 5/66
[52] U.S. Cl. ...................... 428/332; 428/336; 428/694 T; 428/694 ST; 428/694 TS; 428/900; 427/129; 427/130; 427/131; 204/192.2
[58] Field of Search ................................. 428/332, 336, 428/694 T, 694 ST, 694 TS, 900; 204/192.2; 427/128–131

[56] References Cited

U.S. PATENT DOCUMENTS 5,273,834   12/1993   Hoover ................................ 428/694 T
5,733,370   3/1998   Chen et al. ............................... 117/105
5,830,584   11/1998   Chen ....................................... 428/611

OTHER PUBLICATIONS

"The Effects of $Ni_3P$–Sublayer on the Properties of CoNiCr/Cr Media Using Different Substrates", H. Tsai et al., IEEE Transactions on Magnetics, vol. 28, No. 5, Sep. 1992, pp. 3093–3095.

"Structure and Morphology of RF Sputtered Carbon Overlayer Films", S. Agarwal, IEEE Transactions on Magnetics, vol. MAG–21, No. 5, Sep. 1985, pp. 1527–1529.

Primary Examiner—Leszek Kiliman
Attorney, Agent, or Firm—McDermott, Will & Emery

[57] ABSTRACT

A glass or glass-ceramic substrate comprising about 0.5 to about 32 wt. % $Li_2O$ is employed as a non-magnetic substrate of a magnetic recording medium. Migration of Li from the substrate to the medium's surface is prevented by forming an amorphous NiP sealing layer on the substrate, with an optional adhesion enhancement layer therebetween. Embodiments include surface oxidizing the amorphous NiP sealing layer for enhanced recording performance.

20 Claims, 4 Drawing Sheets

MAGNETIC THIN FILM MEDIUM COMPRISING AMORPHOUS SEALING LAYER FOR REDUCED LITHIUM MIGRATION

RELATED APPLICATIONS

This application claims priority from provisional patent application Ser. No. 60/069,539 filed Dec. 12, 1997, entitled "AMORPHOUS SEALING LAYER FOR REDUCED ION MIGRATION/IMPROVED CORROSION RESISTANCE ON GLASS MEDIA," the entire disclosure of which is hereby incorporated herein by reference.

TECHNICAL FIELD

The present invention relates to a magnetic recording medium, such as a thin film magnetic recording disk, and to a method of manufacturing the medium. The invention has particular applicability to a magnetic recording medium exhibiting low noise, high coercivity and suitable for high density longitudinal AND perpendicular recording.

BACKGROUND ART

The requirements for high areal density recording impose increasingly greater requirements on thin film magnetic recording media in terms of coercivity, remanent squareness, low medium noise and narrow track recording performance. It is extremely difficult to produce a magnetic recording medium satisfying such demanding requirements, particularly a high density magnetic rigid disk medium for longitudinal and perpendicular recording.

The linear recording density can be increased by increasing the coercivity of the magnetic recording medium. However, this objective can only be accomplished by decreasing the medium noise, as by maintaining very fine magnetically noncoupled grains. Medium noise is a dominant factor restricting increased recording density of high density magnetic hard disk drives. Medium noise in thin films is attributed primarily to inhomogeneous grain size and intergranular exchange coupling. Therefore, in order to increase linear density, medium noise must be minimized by suitable microstructure control.

A substrate material conventionally employed in producing magnetic recording rigid disks comprises an aluminum-magnesium (Al—Mg) alloy. Such Al—Mg alloys are typically electrolessly plated with a layer of NiP at a thickness of about 15 microns to increase the hardness of the substrates, thereby providing a suitable surface for polishing to provide the requisite surface roughness or texture.

Other substrate materials have been employed, such as glasses, e.g., an amorphous glass, glass-ceramic materials which comprise a mixture of amorphous and crystalline materials, and ceramic materials. Glass-ceramic materials do not normally exhibit a crystalline surface. Glasses and glass-ceramics generally exhibit high resistance to shocks. The use of glass-based materials, such as glass-ceramic materials, is disclosed by Hoover et al., U.S. Pat. No. 5,273,834.

A conventional longitudinal recording disk medium is depicted in FIG. 1 and typically comprises a non-magnetic substrate 10 having sequentially deposited on each side thereof an underlayer 11, 11', such as chromium (Cr) or a Cr-alloy, a magnetic layer 12, 12', typically comprising a cobalt (Co)-base alloy, and a protective overcoat 13, 13', typically containing carbon. Conventional practices also comprise bonding a lubricant topcoat (not shown) to the protective overcoat. Underlayer 11, 11', magnetic layer 12, 12', and protective overcoat 13, 13', are typically deposited by sputtering techniques. The Co-base alloy magnetic layer deposited by conventional techniques normally comprises polycrystallites epitaxially grown on the polycrystal Cr or Cr-alloy underlayer. A conventional perpendicular recording disk medium is similar to the longitudinal recording medium depicted in FIG. 1, but does not comprise any underlayers.

Conventional methods for manufacturing a longitudinal magnetic recording medium with a glass or glass-ceramic substrate comprise applying a seed layer between the substrate and underlayer. Conventional methodology for manufacturing a perpendicular recording medium do not usually comprise applying any seed layer. Longitudinal magnetic recording media with glass or glass-ceramic substrates are commercially available from different manufacturers with different seed layer materials to reduce the effect of high thermal emissivity of such glass and glass-ceramic substrates, and to influence the crystallographic orientation of subsequently deposited underlayers and magnetic layers. Such conventional seed layer materials also include nickel-phosphorous (NiP) which is typically sputter deposited on the surface of the glass or glass-ceramic substrate at a thickness of about 500 Å. Sputtered NiP films on glass or glass-ceramic substrates were reported in the literature for the control of crystallographic orientation of the longitudinal magnetic media and the enhancement of coercivity (for example, Hsiao-chu Tsai et al., "The Effects of $Ni_3P$-sublayer on the Properties of CoNiCr/Cr Media Using Different Substrates," IEEE Trans. on Magn., Vol. 28, p. 3093, 1992).

Conventional longitudinal magnetic recording media comprising a glass or glass-ceramic substrate having NiP sputtered thereon also comprise, sequentially deposited thereon, a Cr or Cr-alloy underlayer at an appropriate thickness, e.g., about 550 Å, a magnetic layer such as Co-Cr-platinum (Pt)-tantalum (Ta) at an appropriate thickness, e.g., about 350 Å, and a protective carbon overcoat at an appropriate thickness, e.g., about 150 Å. Conventional Cr-alloy underlayers comprise vanadium (V) or titanium (Ti). Other conventional magnetic layers are CoCrTa, CoCrPtB, CoCrPt and CoNiCr. The seed layer, underlayer, and magnetic layer are conventionally sequentially sputter deposited on the glass or glass-ceramic substrate in an inert gas atmosphere, such as an atmosphere of pure argon. A conventional protective carbon overcoat is typically deposited in a mixture of argon with nitrogen, hydrogen or ethylene. Conventional lubricant topcoats are typically about 20 Å thick.

Longitudinal magnetic films exhibiting a bicrystal cluster microstructure are expected to exhibit high coercivity, low noise and high remanent squareness. In co-pending application Ser. No. 08/586,571 filed on Jan. 16, 1996, now U.S. Pat. No. 5,830,584, issued Nov. 3, 1998 a magnetic recording medium is disclosed comprising a glass or glass-ceramic substrate and a magnetic layer exhibiting a bicrystal cluster microstructure. The formation of a bicrystal cluster microstructure is induced by oxidizing the surface of a seed layer so that the underlayer subsequently deposited thereon exhibits a (200) crystallographic orientation which, in turn, induces a bicrystal cluster microstructure in a magnetic alloy layer deposited and epitaxially grown on the underlayer.

U.S. Pat. No. 5,733,370 discloses a method of manufacturing a magnetic recording medium comprising a glass or glass-ceramic substrate and a magnetic layer exhibiting a bicrystal cluster microstructure. The disclosed method comprises sputter depositing an NiP seed layer on a glass or glass-ceramic substrate and subsequently oxidizing the deposited NiP seed layer. The oxidized upper seed layer surface induces the subsequently deposited underlayer to exhibit a (200) crystallographic orientation which, in turn, induces the magnetic alloy layer deposited and epitaxially grown on the underlayer to exhibit a bicrystal cluster microstructure. The magnetic recording media disclosed in co-pending application Ser. No. 08/586,571 now U.S. Pat. No. 5,830,584 and U.S. Pat. No. 5,733,370 exhibit high coercivity, low magnetic remanence (Mr)× thickness (t) and low noise, thereby rendering them particularly suitable for longitudinal recording.

In copending application Ser. No. 09/152,324 filed on Sep. 14, 1998, now pending, the adhesion between a seed layer, particularly a NiP seed layer, and a non-conventional substrate, was improved by providing an adhesion enhancement layer, such as Cr or a Cr alloy, between the substrate and the seed layer, with an additional benefit in recording performance obtained by surface oxidizing the seed layer.

The entire disclosures of co-pending applications Ser. No. 08/586,571 now U.S. Pat. No. 5,830,584 and Ser. No. 09/152,324 now pending and U.S. Pat. No. 5,733,370, are incorporated by reference herein.

Some glasses and glass ceramic materials have lithium (Li) and sodium (Na) transition element additions to lower the glass transition temperature of the material. Lowering the glass transition temperature makes forming of glass products easier. A large amount of Li, e.g. about 0.5 to about 32 wt. % of $Li_2O$ is incorporated into $SiO_2$ matrix in ionic form and bonds in an ionic and secondary fashion in the $SiO_2$ networks. The nature of the bonding enables leaching of the Li ions from the glass matrix. A typical magnetic recording medium comprises a CoCr alloy film as a recording layer. The media noise is mainly due to the exchange coupling between the CoCr alloy grains. In order to enhance the Cr segregation into CoCr alloy grain boundary to reduce the intergranular exchange coupling, high temperature sputtering is widely used in the magnetic rigid disc manufacturing industries. The typical substrate temperature during sputtering is about 200° C. to about 250° C. It typically takes several to more than ten minutes to sputter deposit the plurality of films in a pass-by in-line sputtering system. Because the melting point of pure Li is 181° C., the driving force for Li diffusion in the process with so high temperature for so long a time is very large.

The media used in perpendicular magnetic recording do not usually comprise Cr alloy underlayers. Even for the media used in longitudinal magnetic recording, the Cr alloy underlayers can not seal the Li or prevent leaching.

It is well known that sputtered Cr and Cr alloy underlayers of thin film rigid discs exhibit an aggregate of faceted conical columns (Agarwal, S., "Structure and Morphology of RF Sputtered Carbon Overlayer Films," IEEE Trans., Magn., MAG-21, P. 1527, 1985.) The crystalline grain boundaries of the Cr and Cr alloy films are high-diffusion-rate paths. Therefore, the longitudinal magnetic recording rigid discs with Cr or Cr alloy underlayers directly deposited on Li-containing glass or glass-ceramic substrates and the perpendicular recording discs on glass or glass-ceramic substrates often suffer from Li corrosion problems. The Li leaching from the substrates further promotes Co leaching from the magnetic layers of the rigid magnetic discs, and makes the corrosion problems even worse. Corrosion products will be picked up by the recording head causing smearing on the recording head and disc surface, resulting in increased stiction and eventual drive failure.

There exists a need for technology enabling the use of glass and glass-ceramic substrates containing large amounts of Li in magnetic recording media while preventing Li migration from the substrate.

DISCLOSURE OF THE INVENTION

An advantage of the present invention is a magnetic recording medium comprising a glass or glass-ceramic substrate containing a large amount of Li which does not significantly migrate to the surface of the magnetic recording medium.

Another advantage of the present invention is a method of manufacturing a magnetic recording medium comprising a glass or glass-ceramic substrate containing a large amount of Li which does not significantly migrate to the surface of the medium.

Additional advantages and other features of the present invention will be set forth in part in the description which follows and in part will become apparent to those having ordinary skill in the art upon examination of the following or may be learned from the practice of the present invention. The advantages of the present invention may be realized and obtained as particularly pointed out in the appended claims.

According to the present invention, the foregoing and other advantages are achieved in part by a magnetic recording medium comprising: a substrate comprising a glass or glass-ceramic material containing about 0.5 to about 32 wt. % lithium oxide ($Li_2O$); at least one amorphous NiP sealing layer; and a magnetic layer, wherein the sealing layer substantially prevents migration of Li from the substrate. Embodiments include the use of an adhesion enhancement layer between the substrate and the sealing layer, e.g. an adhesion enhancement layer comprising Cr or a Cr alloy. An optional underlayer can be deposited on the sealing layer and the magnetic layer deposited on the underlayer.

Another aspect of the present invention is a method comprising sputter depositing at least one amorphous sealing layer on a substrate comprising a glass or glass-ceramic material containing about 0.5 to about 32 wt. % $Li_2O$; and sputter depositing a magnetic layer on the sealing layer; wherein, the sealing layer substantially prevents migration of Li from the substrate. Embodiments include sputter depositing an amorphous NiP sealing layer from a target containing at least 12 wt. % of phosphorous, sputter depositing an amorphous NiP sealing layer containing boron (B), tungsten (W) or niobium (Nb), and oxidizing the surface of the amorphous NiP sealing layer for improved performance.

Additional advantages of the present invention will become readily apparent to those skilled in this art from the following detailed description, wherein only the preferred embodiment of the present invention is shown and described, simply by way of illustration of the best mode contemplated for carrying out the present invention. As will be realized, the present invention is capable of other and different embodiments, and its several details are capable of modifications in various obvious respects, all without departing from the present invention. Accordingly, the drawings and description are to be regarded as illustrative in nature, and not as restrictive.

DESCRIPTION OF THE INVENTION

Figure 1:
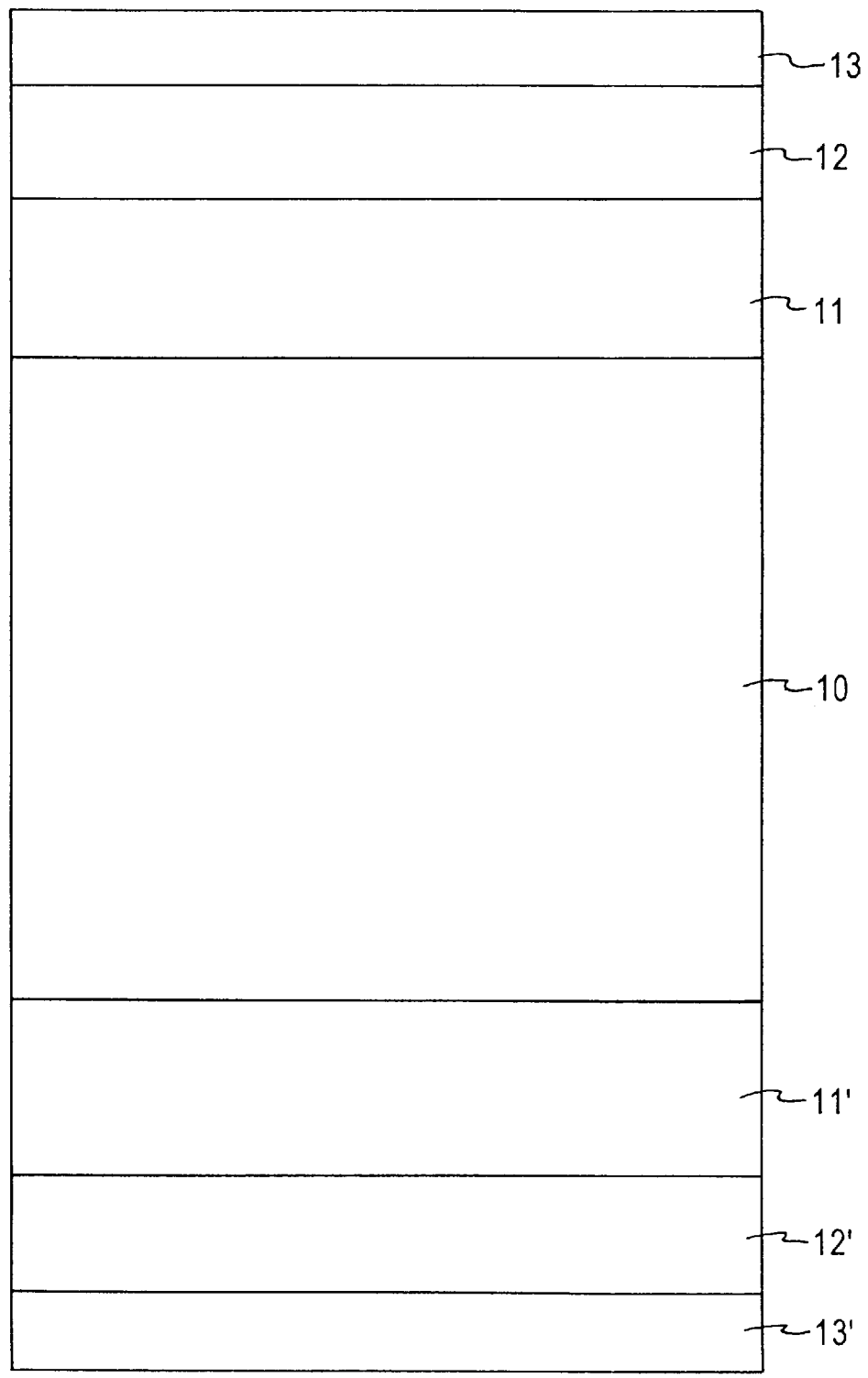
FIG. 1 schematically depicts a conventional magnetic recording medium structure.

The present invention enables the manufacture of magnetic recording media exhibiting low Li migration and suitable for high density longitudinal magnetic recording employing a glass or glass-ceramic substrates having high $Li_2O$ concentrations, e.g., about 5 to about 32 wt. %, thereby advantageously exhibiting a reduced glass transition temperature. As a result, the utility of such magnetic recording media is expanded to extreme environments, including high temperature and high humidity environments. This objective is achieved in accordance with embodiments of the present invention by strategically forming an amorphous sealing layer on the glass or glass-ceramic substrate containing the high Li concentration. Embodiments include sputter depositing an amorphous NiP layer on the glass or glass-ceramic substrate, thereby effectively providing a sealing layer preventing Li migration.

The exact mechanism underpinning the effective sealing of Li to the substrate employing an amorphous layer is not known with certainty. However, it is believed that Li migration is substantially prevented by denying Li ions access to grain boundaries which are high diffusion paths. The amorphous layers are substantially devoid of grain boundaries and, hence, are believed to provide effective sealing of the Li to the substrate.

The amorphous sealing layer or layers can advantageously be deposited at a total thickness of about 300 Å to about 1,000 Å, such as about 400 Å to about 450 Å. The amorphous NiP sealing layer can be sputter deposited employing a target containing at least about 12 wt. % of phosphorous and, optionally, one more elements, such as B, W and Nb.

Embodiments of the present invention also comprise surface oxidizing the surface of an amorphous NiP sealing layer to achieve superior recording performance, particularly for longitudinal magnetic recording. Both surface-oxidized and non-oxidized amorphous NiP sealing layers significantly reduce Li leaching.

Embodiments of the present invention also comprise forming an adhesion enhancement layer, such as Cr or a Cr alloy, between the amorphous NiP sealing layer and substrate for improved adhesion of the amorphous NiP sealing layer to the underlying substrate without reducing the sealing effect of the amorphous NiP sealing layers.

Embodiments of the present invention also comprise depositing an underlayer on the NiP sealing layer or layers, such as a Cr or Cr alloy, e.g., chromium vanadium (CrV), depositing a magnetic layer on the underlayer, such as a Co alloy, e.g., a alloy of Co, Cr, platinum and tantalum (CoCrPtTa), and a carbon-containing overcoat thereon, such as hydrogenated carbon. As in conventional practices, a lubricant topcoat can be applied on the carbon-containing overcoat.

Advantageously, the present invention enables the manufacture of magnetic recording media containing a glass or glass ceramic substrate with a large amount of Li which causes a reduced glass transition temperature, and enables the use of such magnetic recording media under extreme environmental conditions, including high temperature and high humidity. This objective is achieved in accordance with various embodiments of the present invention by depositing an adhesion enhancement layer between the substrate and the amorphous NiP sealing layer, e.g., by depositing an adhesion enhancement layer directly on the substrate and depositing the amorphous NiP sealing layer directly on the adhesion enhancement layer. Embodiments of the present invention comprise sputter-depositing an adhesion enhancement layer which is substantially Cr or a Cr alloy. Suitable Cr alloys include Cr and up to about 30 at. %, e.g., up to about 20 at. %, of an alloying element, such as titanium or vanadium. Advantageously, the present invention can be easily integrated into existing production facilities in a cost effective manner, in that the adhesion enhancement layer and amorphous sealing layer can be sputter deposited.

The crystallographic orientation and morphology of a film deposited on another film depends upon the crystallographic orientation and morphology of the underlying film. In accordance with the present invention, the use of an adhesion enhancement layer deposited between the amorphous NiP sealing layer and the underlying glass or glass-ceramic substrate, does not substantially alter the advantageous crystallographic orientation and low noise of the magnetic recording medium even in embodiments wherein the surface of the amorphous NiP sealing layer is oxidized. In embodiments of the present invention, the amorphous NiP sealing layer is surface-oxidized employing the methodology disclosed in U.S. Pat. No. 5,733,370. The resulting magnetic recording medium is robust and exhibits superior recording characteristics, suitable for high density longitudinal magnetic recording.

The present invention also advantageously enables the production of a magnetic recording medium comprising a magnetic layer exhibiting a bicrystal cluster crystal orientation on a Cr-containing underlayer exhibiting a (200)-dominant crystallographic orientation, with the magnetic layer exhibiting a (1120)-dominant crystallographic orientation.

Figure 2:
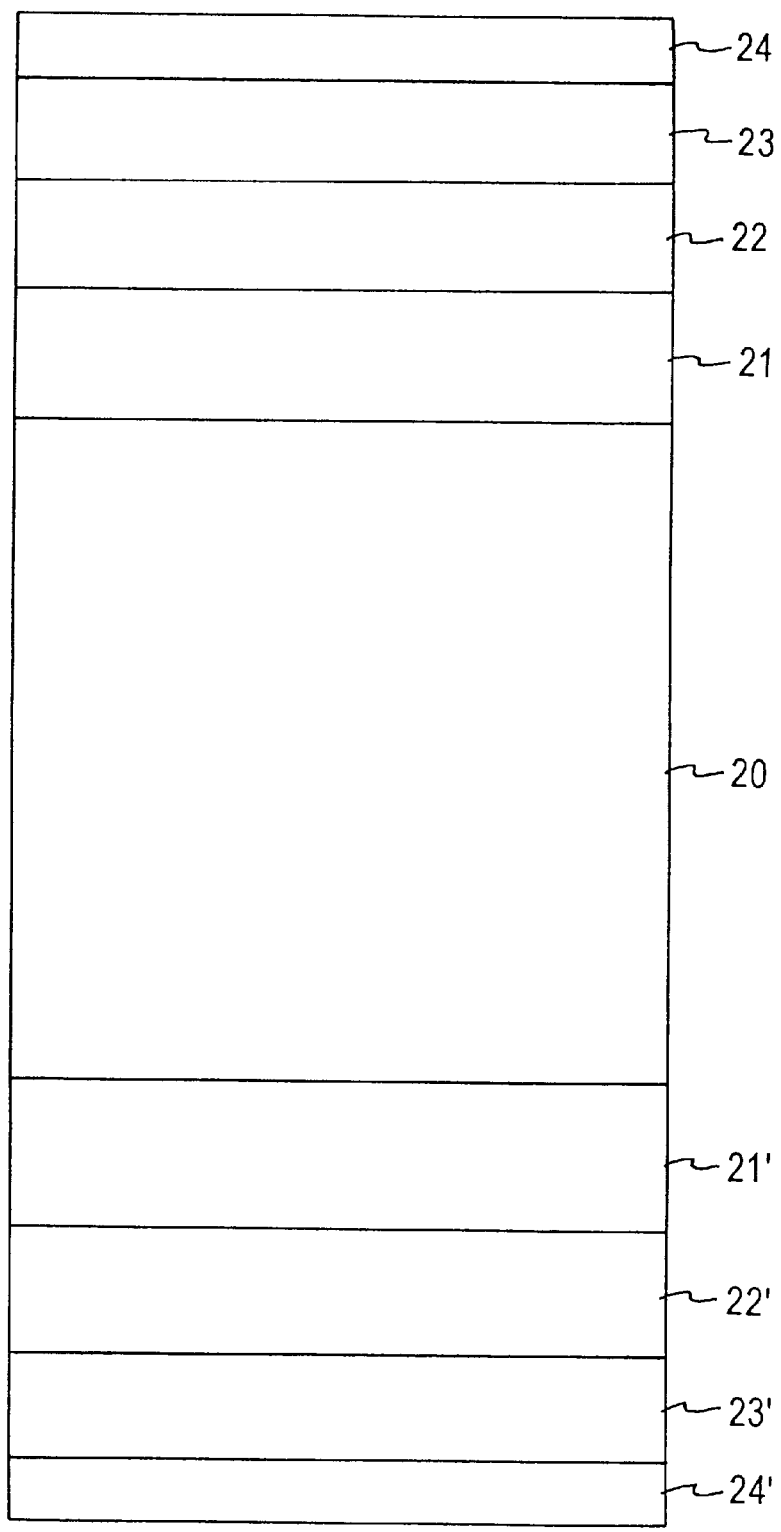
FIG. 2 schematically depicts a magnetic recording medium structure in accordance with an embodiment of the present invention.

An embodiment of the present invention is schematically illustrated in FIG. 2 and comprises a glass or glass-ceramic substrate 20 containing about 10.5 wt. % $Li_2O$. Sequentially deposited on each side of substrate 20 are amorphous NiP sealing layer 21, 21', underlayer 22, 22', magnetic layer 23, 23' and protective overcoat 24, 24'. Embodiments of the present invention also include a lubricant topcoat (not shown) deposited on protective overcoat 24, 24'.

Underlayer 22 can comprise Cr or an alloy thereof, such as CrV. Suitable magnetic layers include Co layers, such as a CoCrPtTa alloy. Suitable materials for protective overcoat 25 include a hydrogenated carbonated film. A Cr or Cr alloy adhesion enhancement layer can optionally be deposited between amorphous NiP sealing layer 21, 21' and substrate 20 at a thickness of about 15 Å to about 200 Å, to improve the adhesion of the amorphous NiP sealing layer without affecting the crystallographic orientation of the underlayer and magnetic layer. Advantageously, the present invention can be conducted by sputter depositing the adhesion enhancement layer, amorphous sealing layer, underlayer, magnetic layer and protective overcoat in an in-line pass-by apparatus comprising a plurality of sequentially spaced sputtering chambers.

EXAMPLES

Example I

Two groups of longitudinal magnetic recording media, three discs in each group, were prepared employing a TS-10 type of glass-ceramic substrate obtained from Ohara Corporation, located in Kanagawa, Japan, containing about 10.5 wt. % $Li_2O$. Each magnetic recording media contained a CrV underlayer, a CoCrPtTa magnetic layer and hydrogenated carbon overcoat. A lubricant topcoat of about 15 Å was applied to the surfaces of the media of each group. One group of media, the conventional media (CD), comprised the CrV underlayer deposited directly on the glass-ceramic substrate. The other group of media (Sample 1, representative of the present invention) comprised a surface oxidized amorphous NiP sealing layer between the substrate and the CrV underlayer. All layers were sputter deposited. The composition of the amorphous NiP sealing layer was 75 at % Ni and 25 at. % P. The underlayer contained 80 at. % Cr and 20 at. % V. The thickness in Angstroms (Å) of the layers of both groups of media and the CoCrPtTa alloy composition in at. % are shown in Table 1 below.

TABLE 1

| \Layer | NiP | CrV | CoCrPtTa | C | Composition of CoCrPtTa in at % |
|---|---|---|---|---|---|
| Conventional Disc | 0 | 2000 | 370 | 175 | Co75, Cr15, Pt6, Ta4 |
| Sample 1 | 380 | 340 | 340 | 125 | Co73, Cr15, Pt8, Ta4 |

The Li and Co on the surfaces of each medium were measured with time-of-flight secondary ion mass spectrometry (TOF-SIMS). The media were analyzed as prime discs with TOF-SIMS. Some of the discs were placed in an environmental chamber at a temperature of 60° C. and at 80% relative humidity (RH) for five days and then analyzed with TOF-SIMS. This test is identified as 60° C./80 RH. The surface concentration of Li and Co are employed as disc corrosion criteria and expressed in μg/disc or ng/disc. The Li and Co leaching in μg/disc on the surfaces of the discs are, as analyzed by TOF-SIMS, listed Table 2 below.

TABLE 2

| \Discs | Conv. 1 | Conv. 2 | Conv. 3 | Conv. 4 | Conv. 5 | Sample 1 | Sample 1 |
|---|---|---|---|---|---|---|---|
| Type of test | prime | prime | prime | prime | prime | prime | 60° C./80 RH |
| Li (μg/disc) | 0.0149 | 0.0056 | 0.0047 | 0.0077 | 0.0041 | <0.00002 | <0.00026 |
| Co (μg/disc) | 0.0099 | 0.0118 | 0.0047 | 0.0077 | 0.0041 | <0.0005 | <0.0121 |

The conventional discs were sampled from 5 production days in one month and labelled as Conv. 1, 2, 3, 4 and 5, respectively. As shown in Table 2, the rigid magnetic discs with amorphous NiP layers deposited on the surface of the glass-ceramic substrate contained much less Li and Co leaching than those without the amorphous NiP sealing layers.

Example 2

Two groups of samples, Group I containing 25 discs, and Group II containing 30 discs, were formed by sputter depositing a film structure of Cr/NiP/CrV/CoCrPtTa/C. In Group I, the NiP films were amorphous NiP sealing layers with different thicknesses, including 0 thickness meaning no amorphous NiP sealing layer, were not oxidized, and the CrV underlayers were directly deposited on the sputtered amorphous NiP sealing layers. The amorphous NiP sealing layers of different thicknesses and the Cr films, in situations where an NiP film was not deposited on the Cr film, of the discs of Group II were surface-oxidized. The thickness of the Cr films of the discs in Group I and II were the same, i.e. 34 Å.

Figure 3:
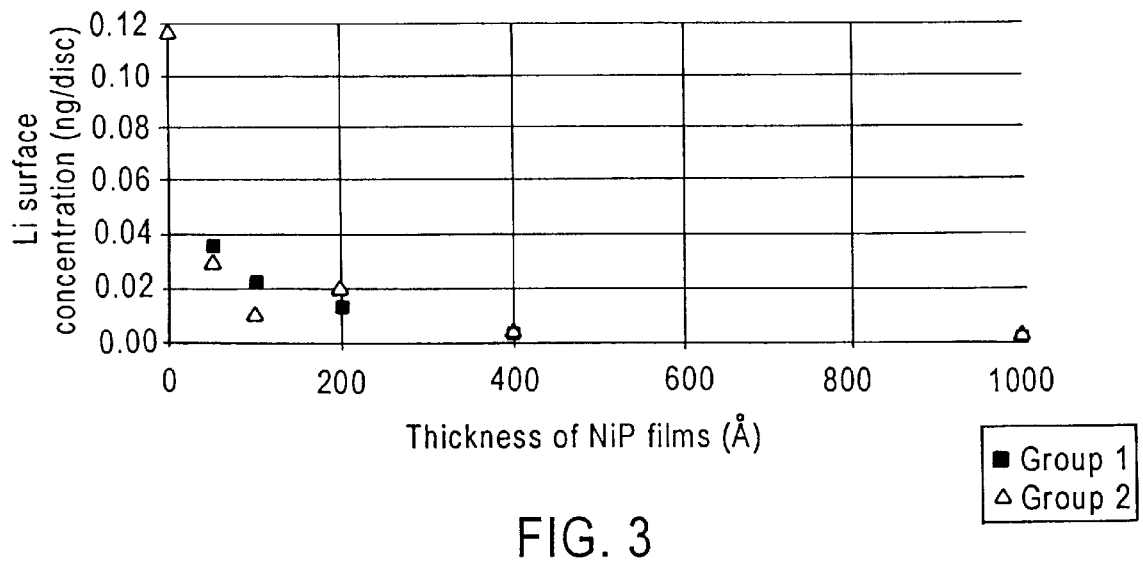
FIG. 3 is a graph illustrating the dependence of Li migration (the prime test) on the thickness of the amorphous NiP sealing layer.
Figure 4:
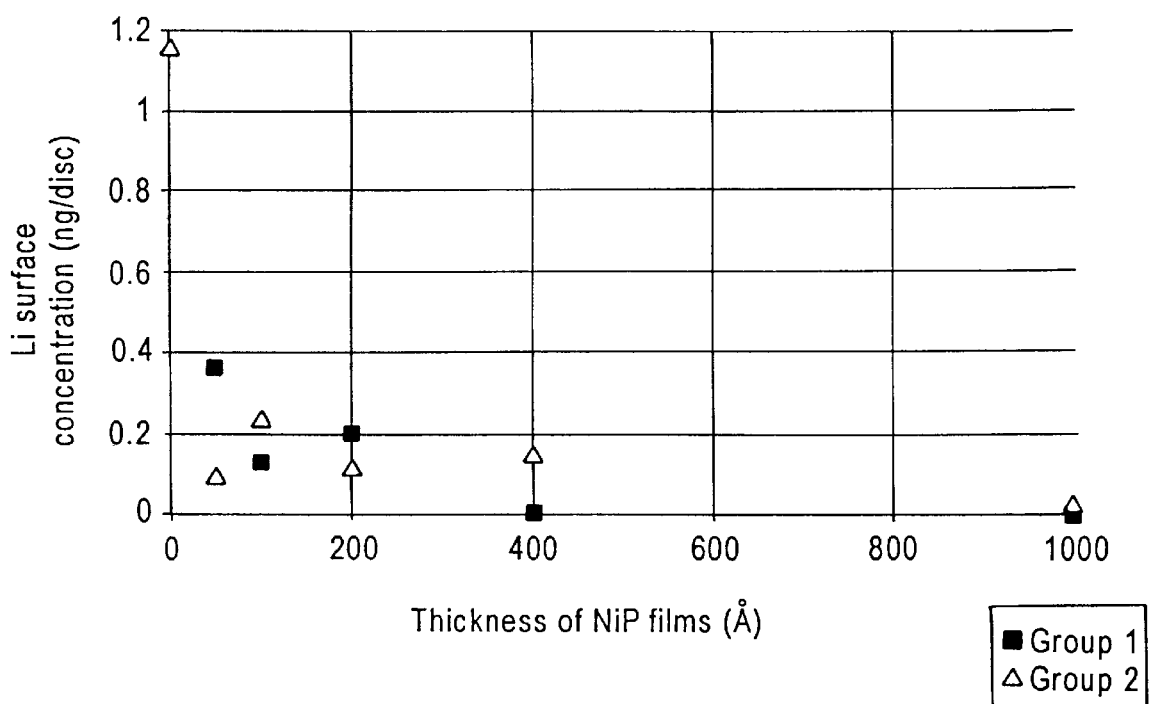
FIG. 4 is a graph illustrating the dependence of Li migration (the 60° C./80 RH test) on the thickness of the amorphous NiP sealing layer.
Figure 5:
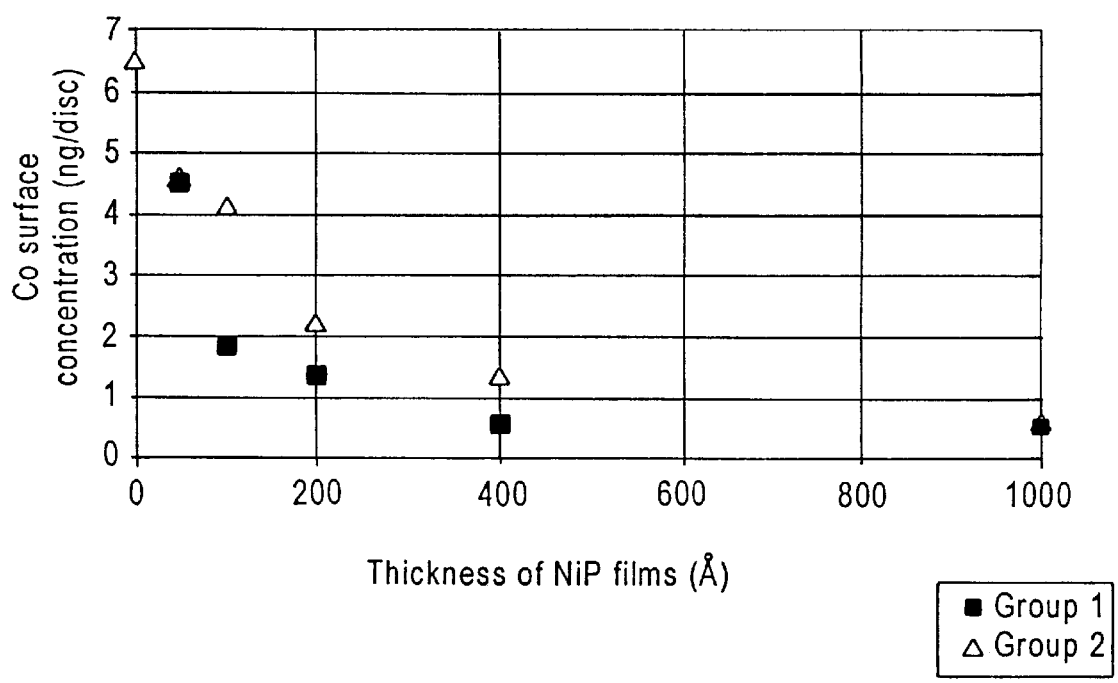
FIG. 5 is a graph illustrating the dependence of Co surface concentration (the 60° C./80 RH test) on the thickness of the amorphous NiP sealing layer.

FIG. 3 illustrates the dependence of the Li surface concentration (the prime test) on the thickness of amorphous NiP films measured with TOF-SIMS. FIG. 4 illustrates the dependence of Li surface concentration (the 60° C./80 RH test) on the thickness of amorphous NiP sealing films measured with TOF-SIMS. FIG. 5 illustrates the dependence of Co surface concentration (the 60° C./80 RH test) on the thickness of amorphous NiP sealing films measured with TOF-SIMS. FIGS. 3–5 evince the same trend, i.e. the Li and Co leaching is significantly reduced when the thickness of the NiP film increases. It is apparent from FIGS. 3–5 that an amorphous NiP sealing film of about 400 Å, whether surface oxidized or not surface oxidized, dramatically reduces Li leaching to an acceptable level.

The present invention provides an amorphous sealing layer, thereby advantageously enabling the use of magnetic recording medium containing a glass or glass-ceramic substrate having a $Li_2O$ concentration of about 0.5 to about 32 wt. % without any substantial Li migration. Accordingly, glass and glass-ceramic substrates having a high Li concentration can be employed with a low glass transition temperature. The use of the inventive magnetic recording media can, therefore, be expanded to extreme environments, such as high temperature and high humidity environments without any substantial Li migration. The amorphous sealing layer can comprise NiP, and can contain B, W, and Nb. The present invention is applicable to the production of various type of magnetic recording medium, particularly high area density magnetic recording media for longitudinal or perpendicular recording.

The underlayer employed in the present invention can comprise any of various materials conventionally employed as an underlayer in the production of magnetic recording media, such as Cr, CrV or CrTi. It has been found that an underlayer thickness of about 100 Å to about 2000 Å, such as about 550 Å, is suitable.

The magnetic layer of the present invention can comprise any magnetic alloy conventionally employed in the production of magnetic recording media. Such alloys include, but are not limited to, Co-based alloys such as CoCr, CoCrTa, CoNiCr, CoCrPtTa, CoCrPt, CoNiPt, CoNiCrPt and CoCrPtB. The thickness of the magnetic layer is consistent with the thickness of magnetic layers of conventional magnetic recording media. A Co-base alloy having a thickness of about 100 Å to about 1000 Å, such as about 200 Å to 500 Å, has been found suitable.

As in conventional magnetic recording media, a protective overcoat can be deposited on the magnetic layer by any conventional means, such as sputtering. Protective overcoats can comprise zirconium oxide ($ZrO_2$), carbon, including amorphous carbon (a-C), hydrogenated carbon (a-$CH_x$), silicon carbide (SiC), or a carbon nitride (a-CN$_x$). The protective overcoat is provided in a thickness suitable to protect the underlying layers. An overcoat having a thickness of about 50 Å to about 300 Å, such as about 100 Å to 200 Å has been found suitable. The apparatus employed in the present invention can be any of those sputtering apparatus conventionally employed in the production of magnetic recording medium.

As in conventional magnetic recording media, a layer of a lubricant can be applied on and bonded to the overcoat. The lubricant topcoat can be provided in any suitable thickness. A lubricant thickness of about 5 Å to 50 Å, such as about 10 Å to about 20 Å, has been found suitable.

Only certain embodiments of the present invention and but a few examples of its versatility are shown and described in the present disclosure. It is to be understood that the present invention is capable of use in various other combinations and environments and is capable of changes or modifications within the scope of the inventive concept as expressed herein.

What is claimed is:

1. A longitudinal or perpendicular magnetic recording medium comprising:
    a substrate comprising a glass or glass-ceramic material containing about 0.5 to about 32 wt. % lithium oxide (Li$_2$O);
    at least one sealing layer comprising amorphous nickel-phosphorus; and
    a magnetic layer, wherein the sealing substantially prevents the migration of Li from the substrate.

2. The longitudinal magnetic recording medium according to claim 1, further comprising:
    an underlayer on the sealing layer;
    a magnetic layer on the underlayer; and
    a carbon-containing protective overcoat on the magnetic layer.

3. The magnetic recording medium according to claim 1, wherein the surface of the sealing layer is oxidized.

4. The magnetic recording medium according to claim 1, further comprising an adhesion enhancement layer on the substrate and the sealing layer on the adhesion enhancement layer.

5. The magnetic recording medium according to claim 4, wherein the adhesion enhancement layer comprises chromium or a chromium-alloy.

6. The magnetic recording medium according to claim 1, wherein the thickness of the sealing layer is about 300 Å to about 1,000 Å.

7. The magnetic recording medium according to claim 1, wherein the amorphous nickel-phosphorus sealing layer further comprises about 0.1 wt. % to about 5 wt. % boron, tungsten or niobium.

8. The magnetic recording medium according to claim 2, wherein the surface of the sealing layer is oxidized.

9. The magnetic recording medium according to claim 2, further comprising an adhesion enhancement layer containing chromium or a chromium alloy on the substrate, and the sealing layer on the adhesion enhancement layer.

10. The longitudinal magnetic recording medium according to claim 1, further comprising a chromium-vanadium underlayer on the sealing layer, wherein the magnetic layer comprises an alloy of cobalt, chromium, platinum and tantalum.

11. A method of manufacturing a longitudinal or perpendicular magnetic recording medium, the method comprising:
    sputter depositing at least one sealing layer comprising amorphous nickel-phosphorous on a substrate comprising a glass or glass-ceramic material containing about 0.5 to about 32 wt. % lithium oxide (Li$_2$O); and
    sputter depositing a magnetic layer on the sealing layer;
    wherein the sealing layer substantially prevents migration of Li from the substrate.

12. The method according to claim 11, comprising sputter depositing the sealing layer using a target containing at least 12 wt. % phosphorous.

13. The method according to claim 11, wherein the at least one amorphous nickel-phosphorous layer comprises about 0.1 to about 5 wt. % of boron, tungsten or niobium.

14. The method according to claim 11, further comprising:
    sputter depositing an adhesion enhancement layer comprising chromium or a chromium alloy on the substrate; and
    sputter depositing the at least one sealing layer on the adhesion enhancement layer.

15. The method according to claim 11, further comprising oxidizing an exposed surface of the at least one sealing layer.

16. The method according to claim 14, further comprising oxidizing an exposed surface of the at least one sealing layer.

17. The method according to claim 15, further comprising:
    sputter depositing an underlayer on the sealing layer; and
    sputter depositing a magnetic layer on the underlayer.

18. The method according to claim 16, further comprising:
    sputter depositing an underlayer on the sealing layer; and
    sputter depositing the magnetic layer on the underlayer.

19. The method according to claim 11, wherein the magnetic layer comprises an alloy of cobalt, chromium, platinum and tantalum.

20. The method according to claim 11, comprising sputter depositing the at least one sealing layer to a thickness of about 300 Å to about 1,000 Å.

* * * * *